(12) United States Patent
Narayanan

(10) Patent No.: US 9,652,534 B1
(45) Date of Patent: May 16, 2017

(54) VIDEO-BASED SEARCH ENGINE

(71) Applicant: Amazon Technologies, Inc., Reno, NV (US)

(72) Inventor: Ganesh Narayanan, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 384 days.

(21) Appl. No.: 14/226,245

(22) Filed: Mar. 26, 2014

(51) Int. Cl.
*G06F 17/30* (2006.01)

(52) U.S. Cl.
CPC .. *G06F 17/30825* (2013.01); *G06F 17/30864* (2013.01)

(58) Field of Classification Search
CPC ............... G06F 17/30825; G06F 17/30864
See application file for complete search history.

(56) References Cited

U.S. PATENT DOCUMENTS

| | | | |
|---|---|---|---|
| 5,870,754 A * | 2/1999 | Dimitrova | G06F 17/30799 |
| 6,707,486 B1 * | 3/2004 | Millet | H04N 7/18 250/340 |
| 6,774,917 B1 * | 8/2004 | Foote | G06F 17/30814 707/E17.028 |
| 7,199,798 B1 * | 4/2007 | Echigo | G06F 17/30259 345/473 |
| 7,447,337 B2 | 11/2008 | Zhang | |
| 8,406,507 B2 | 3/2013 | Ruzon | |
| 8,452,778 B1 | 5/2013 | Song | |
| 8,515,933 B2 | 8/2013 | Tu | |
| 2006/0048191 A1 * | 3/2006 | Xiong | G06F 17/30799 725/52 |
| 2007/0288855 A1 | 12/2007 | Rohrabaugh | |
| 2008/0046406 A1 * | 2/2008 | Seide | G06F 17/30743 |
| 2010/0138798 A1 * | 6/2010 | Wilson | G06F 3/017 715/863 |
| 2012/0150890 A1 * | 6/2012 | Jeong | G06F 17/30787 707/758 |

(Continued)

OTHER PUBLICATIONS

Chuan-Yu Cho et al., "Efficient Motion-Vector-Based Video Search Using Query by Clip", 2004, IEEE, pp. 1027-1030.*

(Continued)

*Primary Examiner* — Apu Mofiz
*Assistant Examiner* — Jared Bibbee
(74) *Attorney, Agent, or Firm* — Knobbe Martens Olson & Bear LLP

(57) ABSTRACT

A video search system provides a user with a list of videos that are similar to a reference video selected by the user. A client device operated by the user may receive the reference video and transmit it to the video search system. The video search system generates a reference textual representation of actions depicted in the reference video based on an analysis of the contents of the reference video. The video search system further compares the reference textual representation with a plurality of textual representations generated based on videos stored in a library of videos. Based at least partly on the comparison, the video search system generates video search results that are provided to the client device. In certain functions, the client device may generate the reference textual representation and transmit the reference textual representation to the video search system for comparison.

20 Claims, 8 Drawing Sheets

(56) References Cited

U.S. PATENT DOCUMENTS

2013/0104251 A1* 4/2013 Moore ................ G06F 21/602
726/30
2013/0173635 A1* 7/2013 Sanjeev ............ G06F 17/30825
707/748
2013/0279603 A1 10/2013 Li

OTHER PUBLICATIONS

Wei-Te Li et al., "Exploring Visual and Motion Saliency for Automatic Video Object Extraction", Jul. 2013, IEEE, vol. 22, No. 7, pp. 1-11.*
Ihab Al Kabary et al., "SportSense: Using Motion Queries to Find Scenes in Sports Videos", Oct. 27, 2013, ACM, pp. 1-3.*
Shih-Fu Chang et al., "VideoQ: A Fully Automated Video Retrieval System Using Motion Sketches", 1998, IEEE, pp. 270-271.*

* cited by examiner

VIDEO-BASED SEARCH ENGINE

BACKGROUND

Many network resources, such as websites, offer users the ability to search for and view video files. For example, a user may provide one of a website with a search query (e.g., a keyword, a title of a video) and the website may return a list of results that match or partially match the provided search term. A user may provide additional search criteria, such as a date that a video was created or uploaded, a genre, a duration, and/or the like to narrow the search results.

However, often a user has trouble finding the right video. The user may have to view several of the videos in the search results to identify the right video. In some instances, the right video does not even appear in the search results. For example, those who upload videos frequently do not take the time to supply an accurate description of the video or any description at all. A video desired by the user may then not appear in the search results. As another example, users commonly use different words or phrases to describe the same thing. A search query provided by the user may include a different word or phrase than what is included in the description such that the video desired by the user does not appear in the search results. As another example, a user may remember what is depicted in a clip of the video, but may not remember the name of the video or any other identifying information. Thus, the user may provide a search query that is not associated with the desired video.

DETAILED DESCRIPTION

Figure 1:
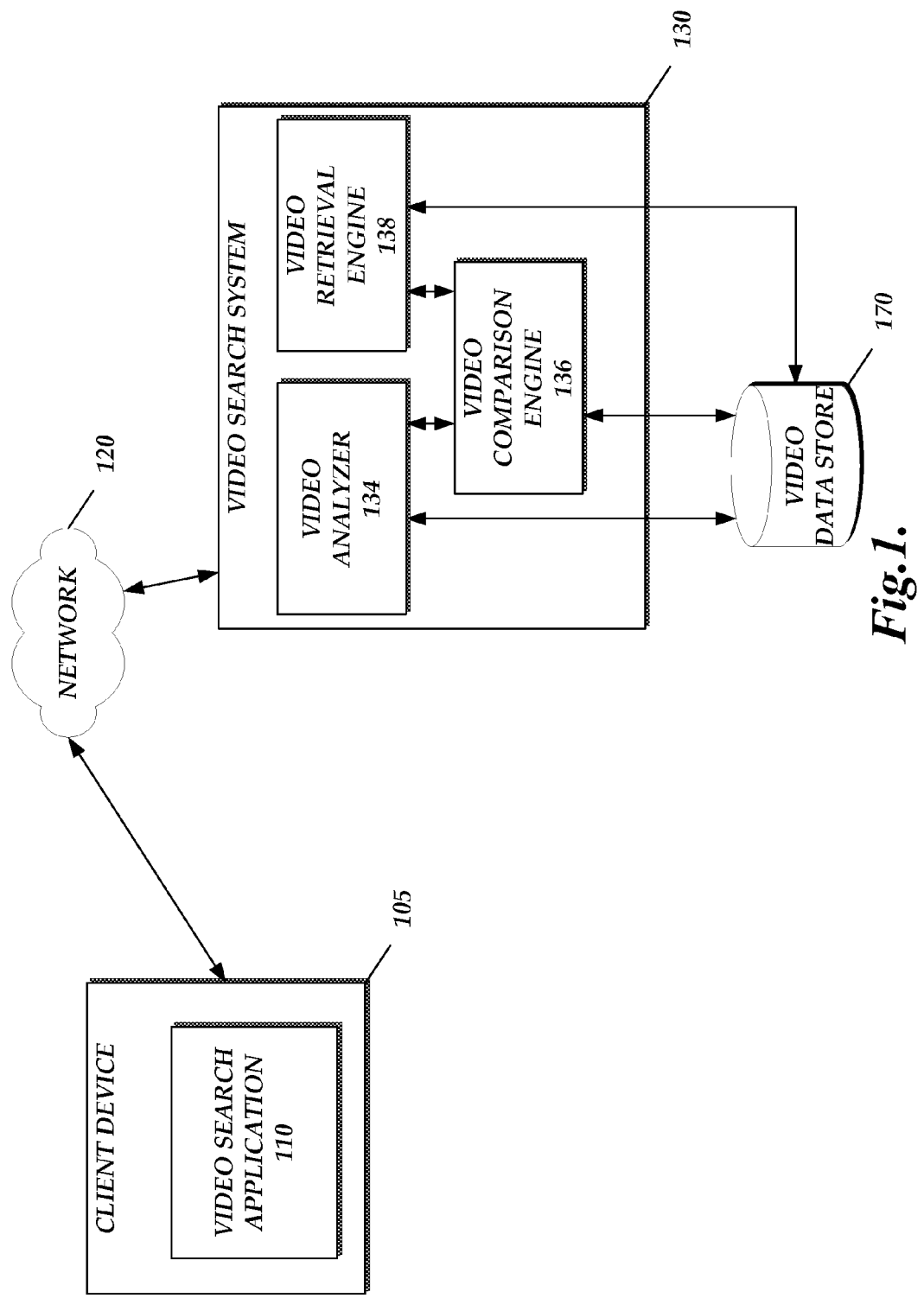
FIG. 1 is a block diagram of an illustrative operating environment including a video search system formed in accordance with an embodiment of the present disclosure.

As described above, a user may have trouble finding a desired video or other visual or audio-visual content using conventional search methods (hereinafter, the term "video" may be used to refer to any visual or audio-visual content that may be presented continuously over time, such as a movie, television program, music video, commercial, video clip, etc.). In some cases, this difficulty may occur because the user lacks knowledge or information that can be used to identify the video. For example, the user may know what a desired activity looks like (e.g., the user may know the actions that are performed, text that is visible, colors of objects, sound that is audible, etc.), but the user may not know the title of the video or any other identifying information. Describing what is depicted in the video using text may not be sufficient to cause a video search engine to list the desired video in the list of search results.

A user, however, may have enough knowledge of what is depicted in the video to be able to recreate at least a portion of what is depicted. For example, the desired video may include several dance moves that the user can perform. Conventional search engines, though, have no mechanism to allow a user to use this knowledge in any meaningful way to find the desired video.

Accordingly, a video search system is described herein that allows a user to search for a desired video based on the user's knowledge of what is depicted in the desired video. For example, a user may record a video of a person (e.g., the user or another person) performing a series of actions and send the recorded video to the video search system. The series of actions in the recorded video may resemble actions performed in the desired video. Alternatively, the user may find and use another video that includes actions similar to those performed in the desired video and send that video (or a selected clip of it) to the video search system.

The video search system may have access to a plurality of stored videos. The video search system may have analyzed the stored videos at a previous time to identify actions performed in each individual video. Upon receiving the reference video from the user, the video search system may parse the reference video to identify performed actions and compare the performed actions with actions performed in the stored videos. If a portion of the actions performed in a respective stored video matches or nearly matches the actions performed in the reference video, the respective stored video may be returned as a search result.

In an embodiment, the video search system analyzes a video by first identifying the objects present in each video frame. For example, objects can include a person, an animal, an inanimate object, and/or the like. Objects may be identified based on differences in background color and foreground color, edge detection, or other image processing techniques. The identified objects may then be converted into basic shapes, such as circles, rectangles, triangles, and/or the like. The conversion from object to shape may be based on differences in background color and foreground color. Each object may be converted into a single shape or a plurality of shapes. Shapes may be grouped together if they originate from the same object.

The video search system may compare the shapes in successive video frames in order to identify a pattern of actions. For example, the video search system may divide each video frame into equally-sized smaller segments (e.g., 4 segments, 9 segments, 16 segments, etc.). Corresponding segments in successive video frames may then be compared (e.g., a top-left segment in a first video frame may be compared with a top-left segment in a second video frame). In some embodiments, a shape in a segment of a first video frame is compared with the same shape in a corresponding segment of a second video frame that follows the first video frame. For example, the video search system may determine whether the shape has moved, and if so, the extent of the movement. To improve the effectiveness of the comparison of segments and/or video frames, at least some segments and/or video frames may be modified before such comparison takes place using techniques described in U.S. Pat. No. 8,406,507 to Ruzon et al. (hereinafter referred to as "Ruzon"), which is incorporated herein by reference in its entirety.

Based on the movement of a shape (or lack of movement of a shape), the video search system can generate a textual representation of the actions performed in a video. The textual representation may include strings of characters. In an embodiment, a string of characters represents a second shape that the movement of the shape creates or does not create. For example, the movement of the shape may create another shape (e.g., a person waving a hand may create an arc). Each shape may be associated with one or more characters and the lack of movement may be represented by one or more characters. In addition, a location within a video frame may be associated with one or more characters (e.g., each segment in a video frame may be associated with one or more characters that reference the location of the segment, such as a location represented by pixel coordinates). The characters associated with the second shape (or the characters associated with the lack of a second shape) may be combined with the characters associated with the location of the second shape in a video frame to form a string of characters. This process can be repeated for each shape in each video frame of the video, and some or all of the generated strings can be combined into a single string of characters or separated into multiple strings of characters (e.g., each string of characters may represent a complete action, where the video may include multiple actions) to create the textual representation.

In another embodiment, a string of characters represents an angular movement of the shape. For example, a shape may rotate from one video frame to the next video frame. A common reference point can be used to determine an angle of the shape in the first video frame (e.g., with respect to a central axis) and an angle of the shape in the second video frame. The shape may be assigned one or more characters, and the string of characters may include a combination of the one or more characters assigned to the shape and the angle of the shape in the first video frame followed by a combination of the one or more characters assigned to the shape and the angle of the shape in the second video frame. This process can be repeated for each shape in each video frame of the video, and some or all of the generated strings can be combined into a single string of characters or separated into multiple strings of characters to create the textual representation.

Portions of or all of a reference textual representation (e.g., a textual representation generated based on a reference video) can be compared with textual representations generated based on the stored videos in order to determine any similarities. For example, a portion of the combined strings of characters may match or match within a threshold value at least a portion of strings of characters generated based on one or more of the stored videos. The stored videos that correspond with matching or partly matching strings of characters may be retrieved and displayed to the user as search results.

In further embodiments, the video search system may allow the user to enter additional search criteria to help narrow the search results. For example, the user can specify a color. When generating the textual representation, the video search system may embed a color of a shape along with the other information described herein. Thus, the video search system may retrieve stored videos if the shape that caused the correlation, e.g., the match or partial match, is the same color or nearly the same color (e.g., within a threshold value of the color provided by the user) as the color provided by the user.

As another example, the user can enter text to be searched within the videos. When analyzing the videos (e.g., when identifying objects and/or shapes), the video search system may identify text present in one or more video frames (e.g., text on a shirt in a video frame, text on a sign in a video frame, etc.). The video search system may also identify words spoken in the videos by applying voice recognition. The presence of text in the video frames and/or words spoken in the videos may be indicated in the string of characters (e.g., independently or in conjunction with another shape). Thus, the video search system may retrieve stored videos if the text provided by the user is present or spoken in the stored video and there is a correlation, e.g., a match or partial match of character strings.

As another example, the user can submit an audio clip (e.g., recorded by the user or by another person). When analyzing the video, the video search system may identify an audio signal that is associated with one or more video frames. The video search system may extract the audio signal and store it with the textual representation. Thus, the video search system may retrieve stored videos if the audio clip provided by the user matches or partially matches (e.g., within a threshold value) the extracted audio signal and there is a match or partial match of character strings.

In further embodiments, the user can further refine the search by narrowing the area of the video provided by the user that is searched and/or by narrowing the area of the stored videos that is compared with the video provided by the user. For example, the user may designate a portion of a reference video and/or a portion of a screen (e.g., several video frames, a specific region in one or more video frames, etc.) that should be the focus for the purpose of analyzing the reference video and conducting the video search. The video search system may then generate the strings of characters only for the portion of the reference video and/or the screen designated by the user. As another example, the user may designate a portion of the stored videos and/or a portion of a screen that should be the focus for the purpose of analyzing the stored videos and conducting the video search. The video search system may then analyze the strings of characters generated from the portion of the stored videos and/or the screen designated by the user when comparing with the strings of characters generated from the reference video.

While the video search system is described herein as generating the textual representation, this is not meant to be limiting. In other embodiments, the user's device may generate the textual representation based on the reference video provided by the user. For example, the user's device may execute an application (e.g., a mobile application) that is capable of analyzing the reference video and sending, to the video search system, a textual representation of the observed actions. The application may include a touch-based user interface for enabling the user to designate the region or portion of interest, such as by drawing a shape (e.g., a rectangle) on the screen. The video search system may compare, using an index stored in a data repository, the strings of characters received from the user's device with those associated with the stored videos to identify search results, and transmit those search results back to the user's device.

In an embodiment, the video search system includes a feedback mechanism to enhance the quality of search results. For example, over time, the video search system may generate similar strings of characters based on reference videos received from users. Strings of characters that are similar and that are generated from user-provided videos may result in the retrieval of the same stored videos as search results. If users tend to select some search results more than others, the order of search results may be adjusted to reflect the preferences of past users when generating a similar string of characters based on a reference video received from a future user. In some embodiments, certain search results are removed if users rarely or never select such results. As another example, the video search system may allow users to rate search results, which may affect the order of search results in future searches.

FIG. 1 is a block diagram depicting of an illustrative operating environment including a video search system 130 according to one embodiment. As illustrated in FIG. 1, the operating environment includes a client device 105, a network 120, a video search system 130, and a video data store 170.

The client device 105 can be configured to submit videos and/or textual representations to the video search system 130. Such transmissions can be made via the network 120. In some embodiments, the client device 105 is configured to execute a video search application 110. The video search application 110 may allow a user to select reference a video to send to the video search system 130. The reference video may be selected from a video available via the network 120, from a video stored in local memory on the client device 105, and/or from a video recorded using an image capturing device embedded within or external to the client device 105. The video search application 110 may also include functionality for analyzing and generating a reference textual representation of the actions depicted in the reference video in a manner as described herein. Furthermore, the video search application 110 may include a special user interface that enables users to designate (e.g., via a touch interface) the portions of a video or screen that are of interest. The video search application 110 may send the reference textual representation to the video search system 130. The client device 105 can also allow a user to select a video available via the network 120 by accessing a network resource, such as a video search website, using an ordinary browser independent of the video search application 110. The client device 105 can also parse a reference video to generate the reference textual representation independent of the video search application 110.

In an embodiment, the client device 105 may be a user device, such as a computing device. For example, the client device 105 may be an electronic device, such as a cell phone, a smart phone, a tablet, a laptop, a personal digital assistant (PDA), a hybrid PDA/mobile phone, a mobile phone, a computer, a desktop, a workstation, an electronic book reader, a set-top box, a camera, an audiobook player, a digital media player, a video game console, a server, a terminal, a kiosk, a clock, an augmented reality device, television, appliance, electronic device for inclusion in vehicles or machinery, or the like. The client device 105 may include a microphone, a speaker, a user input device, a wireless module, a camera, and/or a display.

The network 120 may be a wired network, a wireless network, or a combination of the two. For example, the network 120 may be a personal area network, a local area network (LAN), a wide area network (WAN), or combinations of the same. In addition, the network 120 may be an over-the-air broadcast network (e.g., for radio or television) or a publicly accessible network of linked networks, possibly operated by various distinct parties, such as the Internet. In some embodiments, the network 120 may be a private or semi-private network, such as a corporate or university intranet. The network 120 may include one or more wireless networks, such as a Global System for Mobile Communications (GSM) network, a Code Division Multiple Access (CDMA) network, a Long Term Evolution (LTE) network, or any other type of wireless network. Protocols and components for communicating via any of the other aforementioned types of communication networks, such as the TCP/IP protocols, can be used in the network 120. Protocols and components for communicating via the Internet or any of the other aforementioned types of communication networks are well known to those skilled in the art of computer communications and thus, need not be described in more detail herein.

The video search system 130 may include a video analyzer 134, a video comparison engine 136, and a video retrieval engine 138. In an embodiment, the video search system 130 is configured to perform any or all of the operations disclosed herein. For example, the video analyzer 134 of the video search system 130 can receive a reference video from the client device 105 and generate a reference textual representation of the actions depicted in the reference video. The video analyzer 134 can store the reference textual representation in the video data store 170 and/or provide the reference textual representation to the video comparison engine 136. The video comparison engine 136 can retrieve textual representations generated based on other videos, compare the reference textual representations with the retrieved textual representations, and generate scores representing degrees of similarity between the reference textual representations and the retrieved textual representations. The video comparison engine 136 may provide the generated scores to the video retrieval engine 138, which may retrieve videos that correspond with scores above a threshold value (e.g., videos that match or partially match the reference video) and provide the retrieved videos to the client device 105 via the network 120. As another example, the video comparison engine 136 of the video search system 130 can receive a reference textual representation from the client device 105 via the network 120 and the video retrieval engine 138 can provide videos that correspond with the reference textual representation to the client device 105 as described herein.

In other embodiments, not shown, the video search system 130 can be local to the client device 105. For example, the video search system 130 can be executed by a processor embedded within the client device 105. As another example, the video search system 130 can be executed by another device coupled directly to the client device 105 (e.g., via a wired or wireless connection, such as USB, IEEE 1394, IEEE 802.11, Bluetooth, etc.). The video search system 130, when local to the client device 105, can perform any of the operations discussed herein.

In an embodiment, the video data store 170 stores videos and textual representations associated with each of the videos. In further embodiments, the video data store 170 stores colors associated with shapes in each of the videos, an indication of the text present in each of the videos, and/or audio signals synched with the videos. In some embodiments, the video data store 170 is a single data store. In other embodiments, the video data store 170 is distributed over many different locations. The video data store 170 may be embodied in hard disk drives, solid state memories, any other type of non-transitory computer-readable storage medium, and/or a file, a database, a relational database, stored in any such non-transitory computer-readable medium accessible to the video search system 130. The video data store 170 may also be distributed or partitioned across multiple local and/or storage devices without departing from the spirit and scope of the present disclosure. For example, video data may be stored in different storage devices and/or accessed via different services. In some embodiments, the video data store 170 may implemented as a data storage web service.

Figure 2:
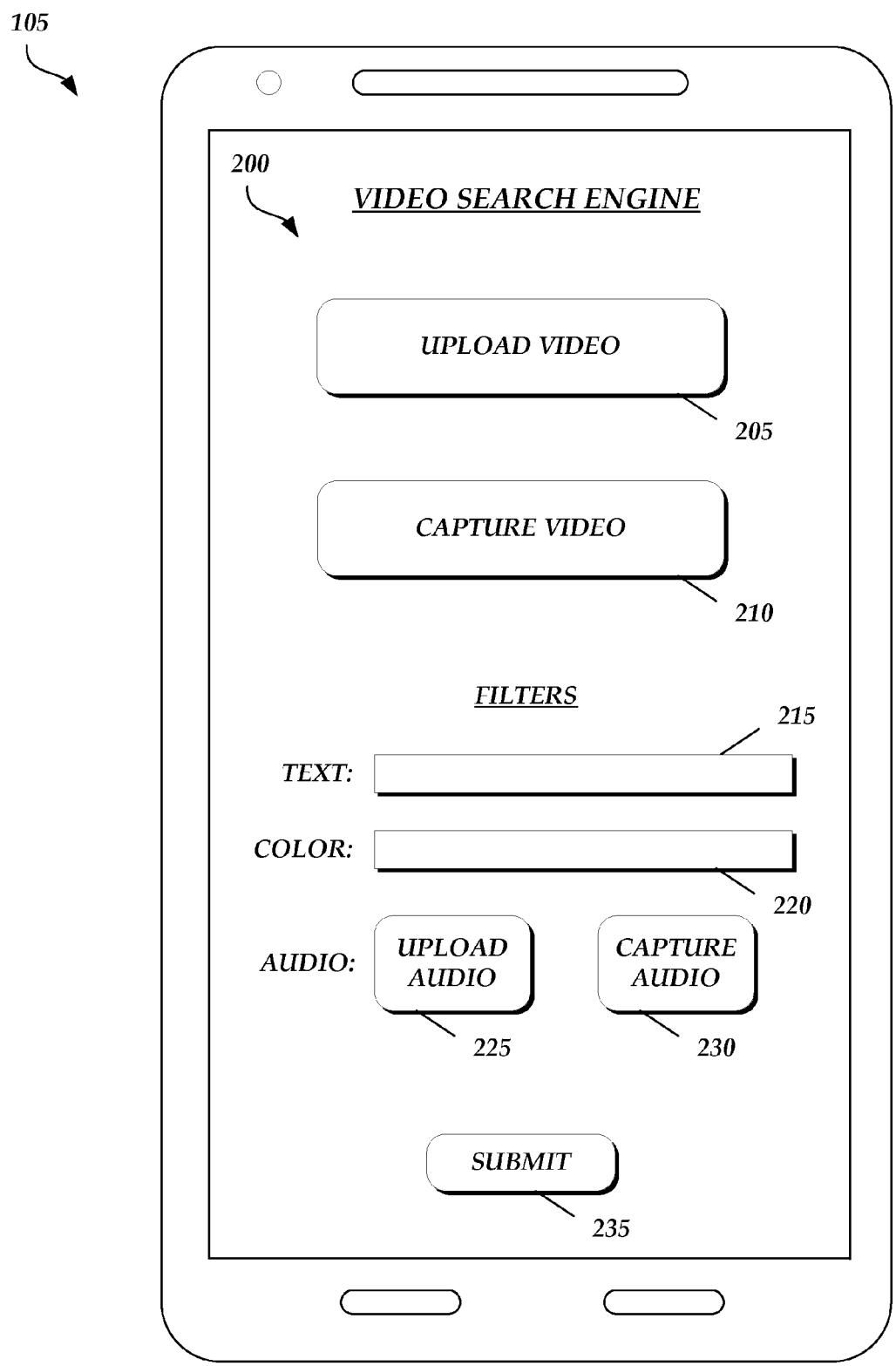
FIG. 2 is a pictorial diagram depicting an illustrative user interface for performing a video search utilizing the video search system shown in FIG. 1.

FIG. 2 is a pictorial diagram depicting an illustrative user interface 200 for performing a video search utilizing the video search application 110 and video search system 130. In an embodiment, the user interface 200 is displayed on the client device 105 and generated by the video search application 110. As illustrated in FIG. 2, the user interface 200 includes an upload video button 205, a capture video button 210, text field box 215, color field box 220, an upload audio button 225, a capture audio button 230, and a submit button 235.

A user may select the upload video button 205 in order to choose a video stored in the local memory of client device 105 or a video available over a network, such as the network 120. A user may select the capture video button 210 to record a video that will be used to generate search results. Selection of the capture video button 210 may enable a camera or other such imaging capturing device (e.g., either built into the client device 105 or externally connected via a wired or wireless connection to the client device 105) to begin recording.

As described herein, selection of a reference video via the upload video button 205 or the capture video button 210 may be sufficient to enable the video search system 130 to provide search results. However, the user may provide additional filtering search criteria. For example, the user may enter text into the text field 215. Entered text may include text that a user thinks may be present in a video frame, such as text on a shirt in a video frame, text on a sign in a video frame, and/or the like. Entered text may also include text that corresponds with a word or words that a user thinks may have been spoken in the video. The video search system 130 (e.g., the video comparison engine 136) may compare the text entered in the text field 215 with text present in the videos stored in the video data store 170. Videos stored in the video data store 170 that include the entered text may be returned as search results if there are also partial or complete character string matches.

As another example, the user may enter a color into the color field 220. The user may enter the name of a color or a color value (e.g., an RGB value, a hexadecimal value, etc.). The video search system 130 (e.g., the video comparison engine 136) may compare the color entered in the color field 220 with the colors of the shapes present in the videos stored in the video data store 170. Videos stored in the video data store 170 that include shapes with the entered color may be returned as search results if there are also partial or complete character string matches that correspond with such shapes.

As another example, the user may choose an audio clip by selecting the upload audio button 225 or the capture audio button 230. Selection of the upload audio button 225 may allow the user to select an audio clip stored in the local memory of the client device 105 or an audio clip available over a network, such as the network 120. Selection of the capture audio button 230 may enable a microphone or other such recording device (e.g., either built into the client device 105 or externally connected via a wired or wireless connection to the client device 105) to begin recording. The video search system 130 (e.g., the video comparison engine 136) may compare the selected audio clip with the audio signals associated with the videos stored in the video data store 170. Videos stored in the video data store 170 that include an audio signal that match or partially match the selected audio clip may be returned as search results if there are also partial or complete character string matches that correspond with such audio signals.

As another example, not shown, the user may be able to select which region and/or video frames of the reference video should be used by the video search system 130 when comparing with the videos stored in the video data store 170. Likewise, the user may be able to select which region and/or video frames of the videos stored in the video data store 170 should be compared with the reference video. Such selections may be made using a touch interface of the client device 105. Thus, the user may be able to isolate a portion of the reference video and/or a portion of the stored videos to improve the search results.

In an embodiment, the user submits the reference video, along with any additional filtering search criteria, by selecting the submit button 235. If the client device 105 is not configured to generate the textual representation, selection of the submit button 235 causes the client device 105 to transmit the reference video, along with any additional filtering search criteria, to the video search system 130. If the client device 105 is configured to generate the textual representation, selection of the submit button 235 causes the client device 105 to generate the textual representation based on the reference video and transmit the textual representation, along with any additional filtering search criteria, to the video search system 130.

Figure 3A:
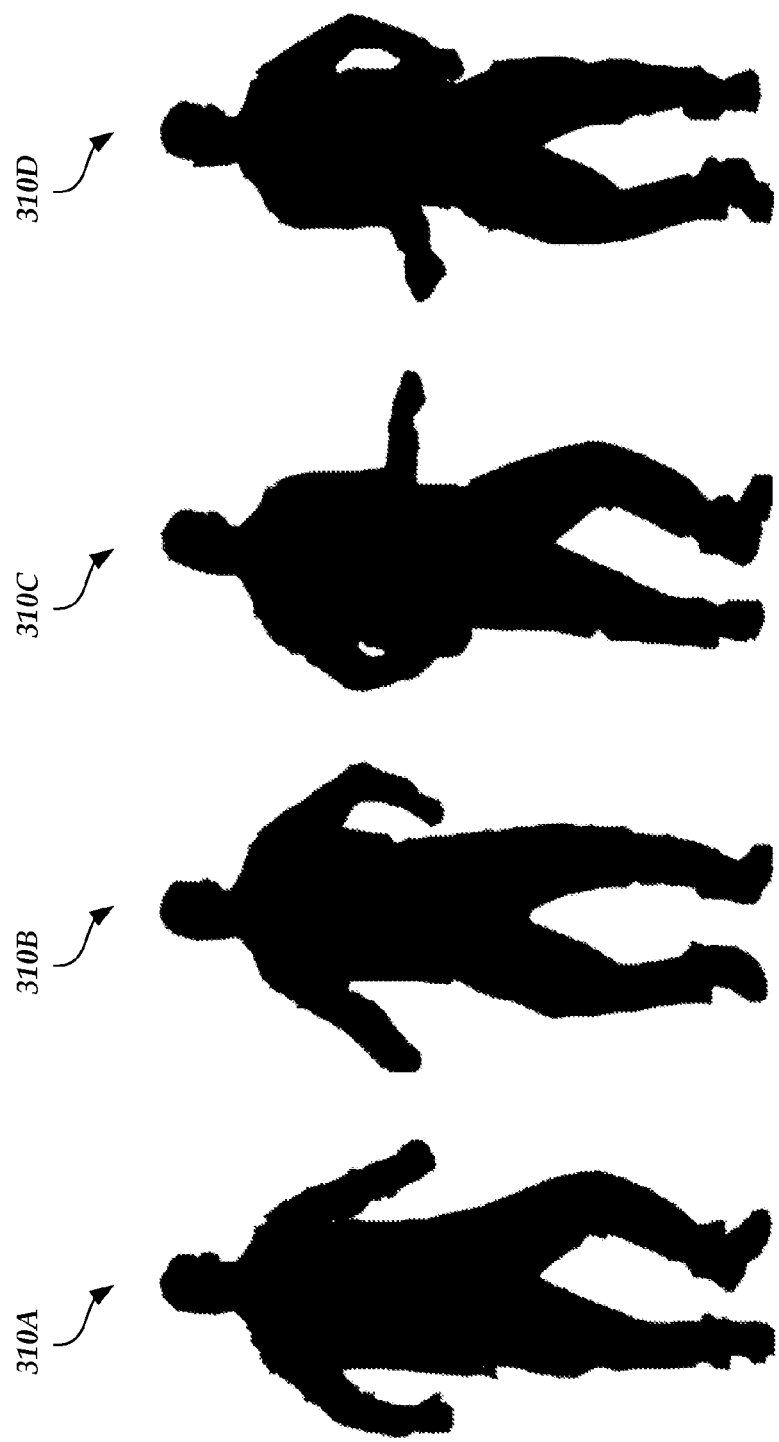
FIGS. 3A-3E are pictorial diagrams illustrating a visualization of a process for creating a textual representation of content in a video, which textual representation may be used to search for a video in accordance with the present disclosure.

FIGS. 3A-3E are pictorial diagrams illustrating a visualization of a process for creating a textual representation based on the contents of a video. In an embodiment, the process is performed by the client device 105 and/or the video search system 130. Four successive video frames 310A-D of a video are illustrated in FIG. 3A. Together, the video frames 310A-D depict the silhouette of a person who is dancing.

When analyzing each of the video frames 310A-D, the client device 105 or the video search system 130 (e.g., the video analyzer 134) may identify the silhouette as a single object (e.g., a person). The object may be identified using edge detection, by comparing a difference in color between the foreground and background of the video frames 310A-D, and/or using other techniques. Other items (e.g., apparel, furniture, etc.) in the video frames 310A-D, not shown, may similarly be identified as individual objects.

Figure 3B:
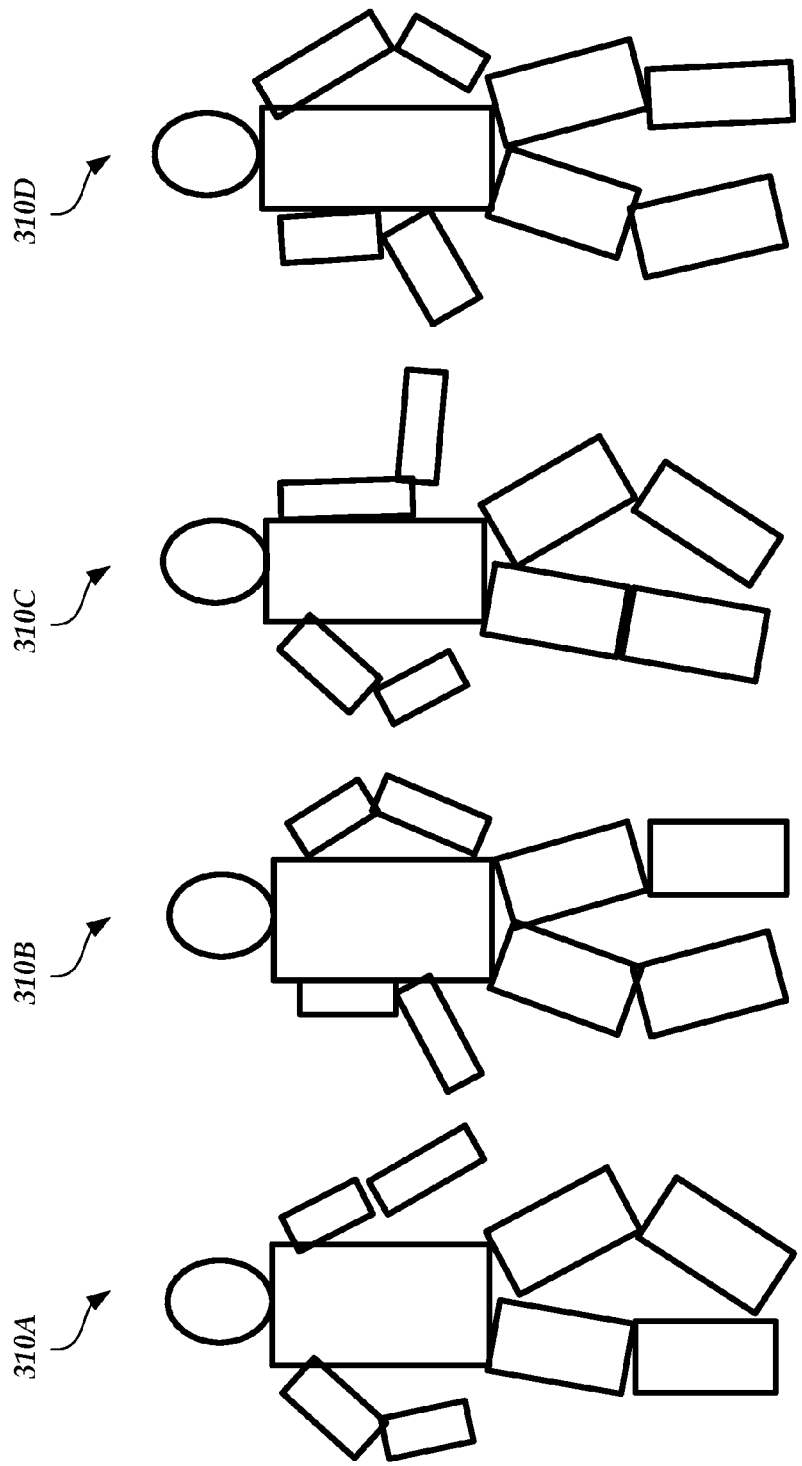

In an embodiment, the client device 105 or video search system 130 (e.g., the video analyzer 134) converts identified objects into shapes. Each object may be converted into a single shape or a plurality of shapes. For example, the silhouette may be converted into a plurality of shapes, as illustrated in FIG. 3B. The shapes may be identified based on color differences (e.g., foreground and background color differences) within the object and/or between objects. The client device 105 or video search system 130 may group shapes that originate from the same object.

Figure 3C:
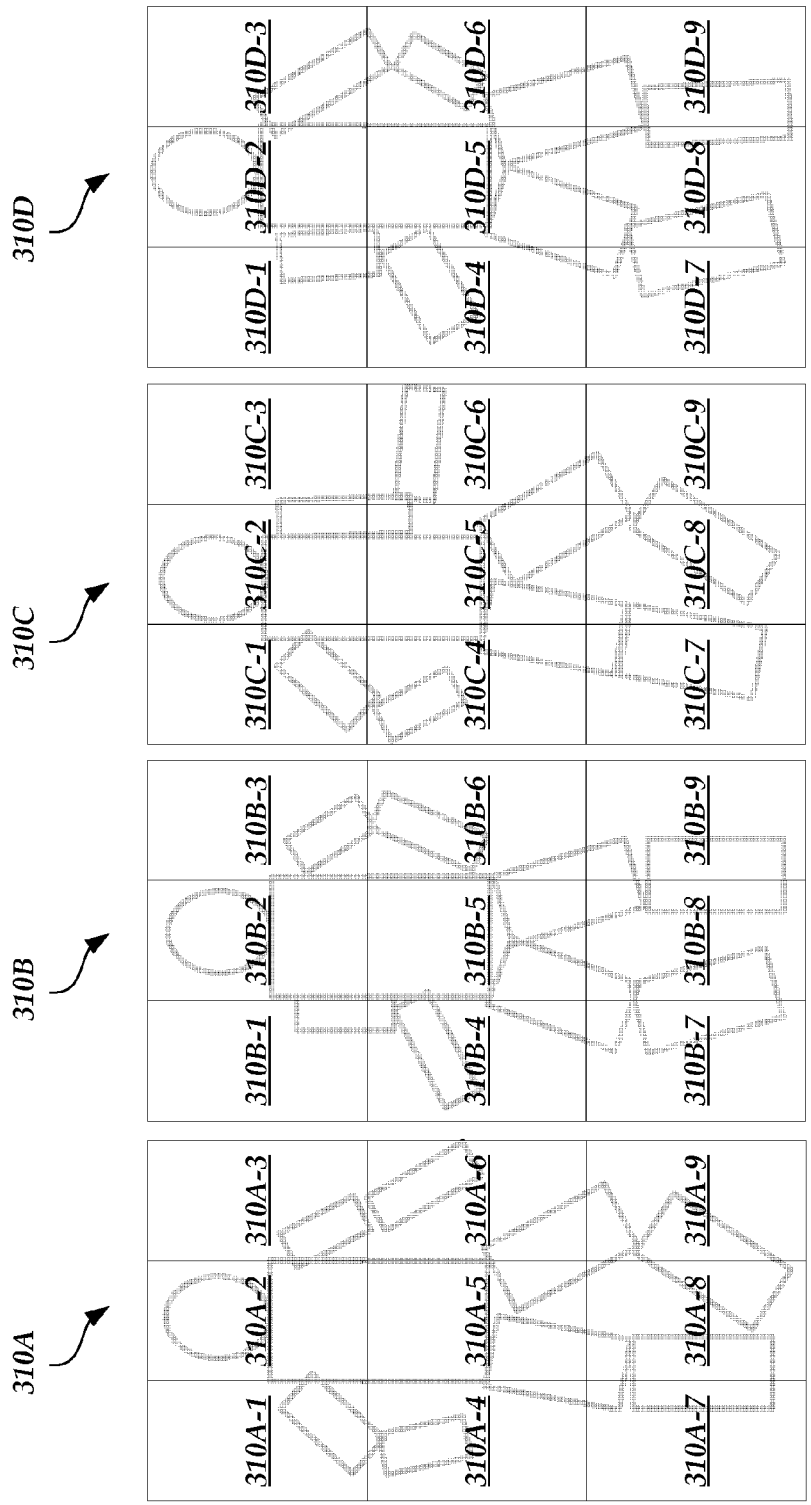

In an embodiment, each video frame 310A-D is divided into segments. The segments may be of the same or different size. For example, video frames 310A-D are each divided into nine segments as illustrated in FIG. 3C. While FIG. 3C depicts each video frame 310A-D as including nine segments, this is not meant to be limiting. The video frames 310A-D may be divided into any number of segments (e.g., one, two, four, six, nine, sixteen, etc.).

The client device 105 or video search system 130 (e.g., the video analyzer 134) may compare segments that correspond with each other in successive video frames 310A-D. For example, segment 310A-1 may be compared with segments 310B-1, 310C-1, and/or 310D-1. Likewise, segment 310A-6 may be compared with segments 310B-6, 310C-6, and/or 310D-6. As described above, in some embodiments, the client device 105 or the video search system 130 modifies one or more of the segments in the video frames 310A-D using the techniques described in Ruzon prior to the comparison.

Figure 3D:
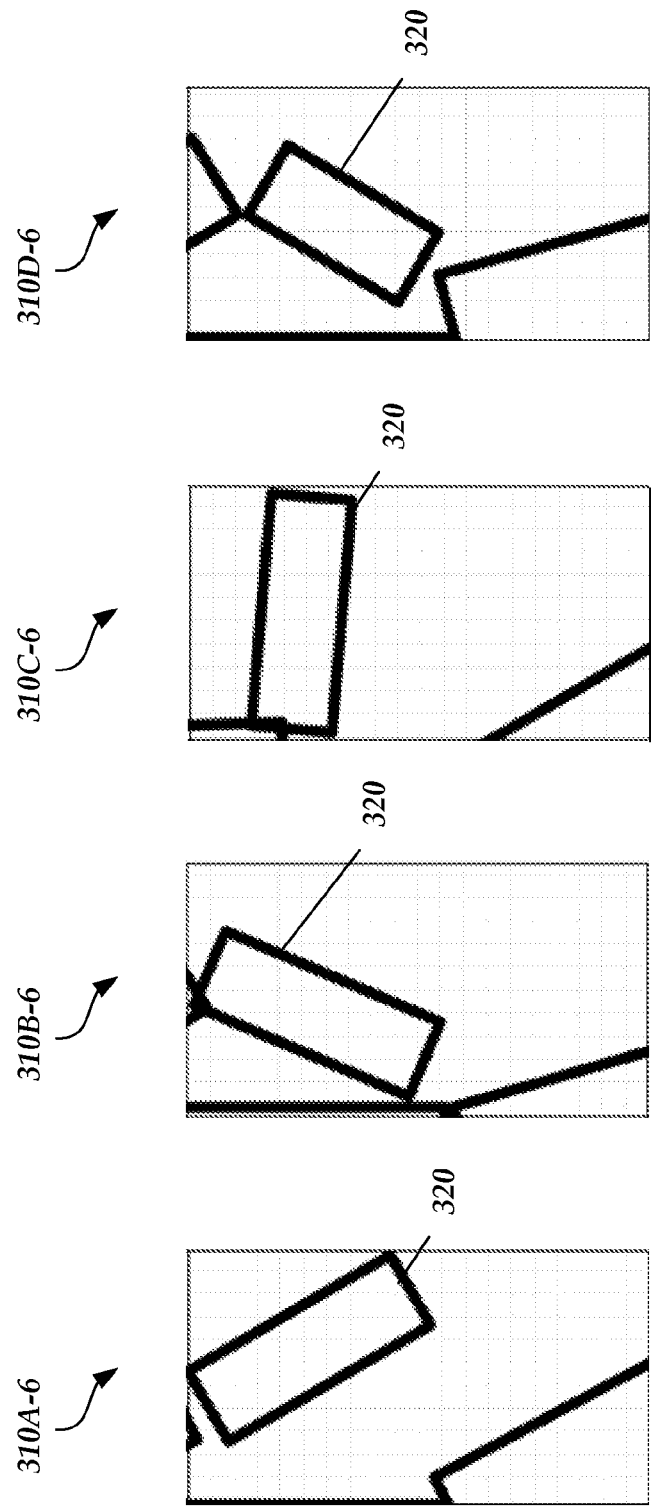

Comparison of the segments may include comparing the shapes included within each segment. For example, segments 310A-6, 310B-6, 310C-6, and 310D-6 may each include shape 320, as illustrated in FIG. 3D. The client device 105 or video search system 130 (e.g., the video analyzer 134) may generate a textual representation based on the movement of shape 320 within one or more of the video frames 310A-D.

In an embodiment, the generated textual representation is based on a shape created by the movement of the shape being analyzed and a location of the created shape. For example, the movement of the shape 320 from video frame 310A to video frame 310B may resemble an arc. The portion of the textual representation derived from shape 320 and video frames 310A-B may include a character that represents an arc (e.g., X) and a character that represents the middle-right region of a frame (e.g., 6), which is the location of the arc. Thus, the portion of the textual representation derived from shape the 320 and video frames 310A-B may be X6. Likewise, the movement of the shape 320 from video frame 310B to video frame 310C may also resemble an arc. Thus, the portion of the textual representation derived from the shape 320 and video frames 310A-C may be X6-X6. This pattern may be repeated for each shape in a video frame and each of the video frames in a video such that the textual representation includes an aggregation of a sequence of characters.

The client device 105 or video search system 130 may skip video frames in generating the textual representation. For example, the movement of a shape between two successive video frames may be minimal. However, the movement of a shape between a first video frame and a third video frame may form a shape. Thus, a portion of a textual representation may include the results of an analysis of a shape between two non-successive video frames.

Figure 3E:
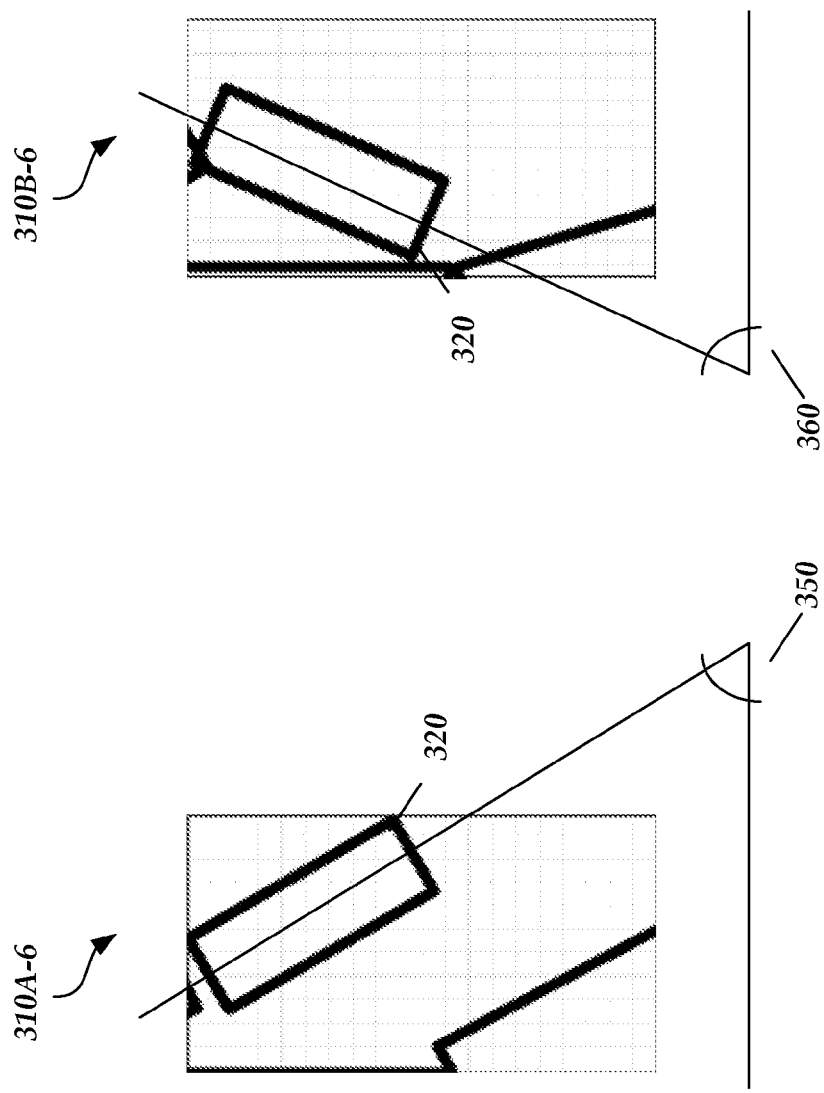

In another embodiment, the generated textual representation is based on the movement of a shape and a type of shape that is being analyzed. A shape may be oriented in a different manner from one video frame to the next video frame (e.g., via movement of the shape). For example, the shape 320 may be pointed to the right in video frame 310A and may be pointed to the left in video frame 310B. A common reference point can be used to determine an angle of the shape 320 in the video frame 310A (e.g., with respect to a central axis) and an angle of the shape 320 in the video frame 310B. As illustrated in FIG. 3E, the angle of the shape 320 in the video frame 310A may be angle 350 and the angle of the shape 320 in the video frame 310B may be angle 360. The numerical value of the angle 350 may be associated with one or more characters (e.g., Y1) and the numerical value of the angle 360 may be associated with a different set of characters (e.g., Y2). Furthermore, each type of shape may be associated with one or more characters and each shape may be associated with one or more characters such that each shape can be uniquely identified. The shape 320 is a rectangle and thus may be associated with characters R1. The portion of the textual representation that corresponds with the shape 320 in video frame 310A may be R1Y1 and the portion of the textual representation that corresponds with the shape 320 in video frame 310B may be R1Y2. Thus, if combined, the portion of the textual representation that corresponds with the shape 320 in video frames 310A-B may be R1Y1-R1Y2. Likewise, the portion of the textual representation that corresponds with the shape 320 in video frames 310A-D may be R1Y1-R1Y2-R1Y3-R1Y4. This pattern may be repeated for each shape in a video frame and each of the video frames in a video such that the textual representation includes an aggregation of a sequence of characters.

The textual representation may include a single sequence that includes a combination of character sequences. Alternatively, the textual representation may include multiple sequences organized by video frame, time, and/or segments within video frames. For example, the same segment within a set of video frames may include multiple shapes (e.g., represented as R1 for a first rectangle, S1 for a first square, and C1 for a first circle). A first sequence in the textual representation may correspond with the segment and may include multiple subsequences, where each subsequence corresponds with a shape (e.g., R1, S1, or C1). The first sequence may appear as follows:

R1Y1-R1Y2-R1Y3-R1Y4, S1A1-S1A2-S1A3-S1A4, C1B1-C1B2-C1B3-C1B4 The characters R1Y1, S1A1, and C1B1 (e.g., the first part of each subsequence) may correspond with the first video frame (e.g., video frame 310A). The characters R1Y2, S1A2, and C1B2 (e.g., the second part of each subsequence) may correspond with the second video frame (e.g., video frame 310B), and so on. Each corresponding part of a subsequence may also correspond with a time. For example, characters R1Y1, S1A1, and C1B1 may correspond with the first second of time in the video. The textual representation may additionally include other sequences that correspond with other segments in the video frames.

As described herein, the sequences in the textual representation may be indexed and stored in the video data store 170. The sequences may be indexed based on how the sequences are organized (e.g., by video frame, time, and/or segments within video frames).

In an embodiment, the video search system 130 (e.g., the video comparison engine 136) retrieves the sequences stored in the video data store 170 and compares such sequences to the sequences generated based on the reference video provided by the user via the user interface 200. If at least a portion of a sequence stored in the video data store 170 matches a sequence generated based on the reference video (e.g., R1Y1-R1Y2-R1Y3-R1Y4 is present in both sequences), then the video search system 130 (e.g., the video retrieval engine 138) may retrieve the video associated with the matching sequence from the video data store 170. Similarly, if at least a portion of a sequence stored in the video data store 170 partially matches a sequence generated based on the reference video within a threshold value (e.g., R1Y1-R1Y2-R1Y3-R1Y4 is present in one sequence, and R1Y1-R1Y2-R1Y4 is present in another sequence), then the video search system 130 (e.g., the video retrieval engine 138) may retrieve the video associated with the partially matching sequence from the video data store 170.

In further embodiments, the sequences in the textual representation include shape color information. For example, as described above, the video search system 130 (e.g., the video analyzer 134) may associate a shape with a set of characters (e.g., R1). The video search system 130 (e.g., the video analyzer 134) may additionally associate the shape with another set of characters that represent the color of the shape (e.g., RGB values, hexadecimal values, etc.). As an example, if the color of the shape 320 is blue, the shape 320 may be represented as R1#0000FF, where #0000FF is the hexadecimal value for "blue." Thus, the sequence for the shape 320 may be represented as follows:

R1#0000FFY1-R1#0000FFY2-R1#0000FFY3-R1#0000FFY4

Thus, if the user provides a color as an additional filtering search criteria, the video search system 130 (e.g., the video comparison engine 136) may, in addition to comparing the sequences as described above, check whether the color of the shape 320 and the color provided by the user match or match within a threshold value (e.g., the colors are within a certain hexadecimal value of each other) before selecting the appropriate video as a potential search result.

The video search system 130 (e.g., the video retrieval engine 138) may transmit the retrieved video, along with any other such retrieved videos, to the client device 105 as search results. The search results may be displayed in the user interface 200 (e.g., generated by the video search application 110). The user may optionally choose to view the search results in an order of best match (e.g., full matches may be displayed ahead of partial matches).

In an embodiment, the video search system 130 (e.g., the video comparison engine 136) uses a feedback mechanism to improve search results. For example, the video search system 130 (e.g., the video comparison engine 136) may receive information from the client device 105 about which search results are selected by a user and which search results are not selected by the user. Such data can be used to refine future generated degree of similarity scores (and thus future search results) such that videos selected more often appear as more relevant search results and videos that are not selected often appear as less relevant search results (or do not appear at all). As another example, the video search system 130 (e.g., the video retrieval engine 138) may provide information to the client device 105 that allows the user to rate videos in the search results. The video search system 130 (e.g., the video comparison engine 136) may receive such ratings and use them to refine future generated degree of similarity scores (and thus, future search results).

Figure 4:
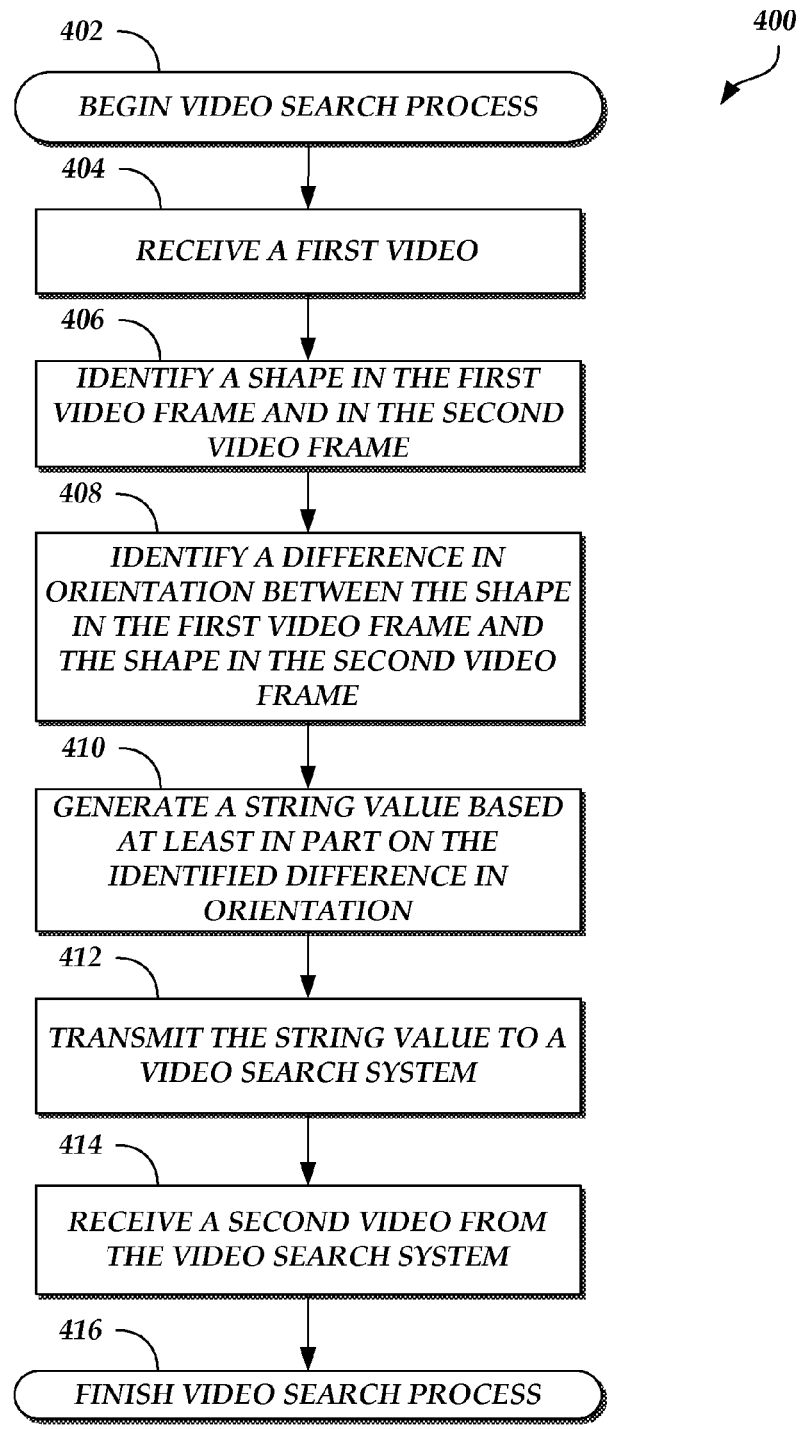
FIG. 4 is a flow diagram depicting an illustrative process that may be used to search for a video utilizing a client device and the video search system shown in FIG. 1.

FIG. 4 is a flow diagram depicting an illustrative video search process 400 that may be used by a client device to receive a set of videos from the video search system 130 that are similar to a video provided by a user. As an example, the client device 105 of FIG. 1 can be configured to execute the video search process 400. However, in other embodiments, the video search system 130 can be configured to execute all or a portion of the video search process 400. The video search process 400 begins at block 402.

At block 404, a first video is received. In a further embodiment, the first video is provided by the user and includes a first video frame and a second video frame. In another embodiment, the video is received from another computing device. At block 406, a shape in the first video frame and in the second video frame is identified.

At block 408, a difference in orientation between the shape in the first video frame and the shape in the second video frame is identified. At block 410, a string value is generated based at least in part on the identified difference in orientation.

At block 412, the string value is transmitted to a video search system, such as video search system 130. In an embodiment, the video search system uses the string value to identify one or more videos from which matching or partially matching string values were generated. At block 414, a second video is received from the video search system. After the second video is received, the video search process may be complete, as shown in block 416.

In some embodiments, the video comparison engine 136 may additionally or alternatively operate in an offline mode in which the video comparison engine 136 compares the textual representations of the videos stored in the video data store 170. "Offline" in this contexts means that the comparison process is not responsive to a user's search. Based on this offline analysis, the video comparison engine 136 may generate a mapping of videos to similar videos. This mapping may be used in various contexts to recommend videos to users. For example, when a user selects a video for viewing, the video search system 130 may output for presentation to the user a listing or grouping of the most similar videos. As another example, the mapping may be used to generate personalized video recommendations that are based on the viewing histories of users.

All of the methods and tasks described above may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a hardware processor (or multiple hardware processors) that executes specifically configured program instructions or modules stored in a memory or other computer-readable storage medium. Each such processor includes digital logic circuitry. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

For example, the functional components 105, 120, and 130 shown in FIG. 1 may be implemented by a programmed computer system that includes one or more physical computers or computing devices. Different components 105, 120, and 130 may, but need not, be implemented on or by different physical machines. The data repository 150 shown in FIG. 1 may be implemented as databases, flat files, and/or any other type of computer-based storage system that uses persistent data storage devices to store data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The foregoing embodiments are intended to be non-limiting. Other embodiments, including embodiments that do not provide all of the benefits and features set forth herein, are also within the scope of protection. Accordingly, the scope of protection is defined only by reference to the appended claims.

What is claimed is:

1. A computer-implemented method of searching for a video, the method comprising:
    as implemented by one or more computer systems comprising computer hardware and memory, the one or more computer systems configured with specific executable instructions,
        receiving, from a client device, a first video, wherein the first video comprises a first video frame and a second video frame;
        identifying an object in the first video frame and the second video frame;
        converting the object into a shape based at least in part on a difference in background color and foreground color in the first video frame and a difference in background color and foreground color in the second video frame;
        comparing a location of the shape in the first video frame with a location of the shape in the second video frame;
        identifying a movement of the shape based at least in part on the comparison;
        assigning an object reference to the shape;
        determining a first angle between the shape and a fixed axis in the first video frame;
        determining a second angle between the shape and the fixed axis in the second video frame;
        generating a first string value based at least in part on the object reference, the first angle, and the second angle;
        retrieving a set of string values generated from videos stored in a video data repository;
        comparing the first string value with each of the string values in the set of string values;
        identifying a second string value based at least in part on the comparison of the first string value with each of the string values in the set of string values, wherein the second string value correlates to the first string value;
        retrieving a second video from the video data repository, wherein the second string value was generated from the second video; and
        transmitting the second video to the client device in response to the received first video.

2. The computer-implemented method of claim 1, wherein the first string value comprises:
    a first field, the first field comprising a combination of the object reference and the first angle; and
    a second field that follows the first field, the second field comprising a combination of the object reference and the second angle.

3. The computer-implemented method of claim 2, wherein the second string value comprises a third field and a fourth field that follows the third field, and wherein the third field correlates to the first field and the fourth field correlates to the second field.

4. The computer-implemented method of claim 1, further comprising:
    comparing a color value of the shape with a color value of the second shape; and
    transmitting the second video to the client device in response to the received first video if the color value of the shape and the color value of the second shape satisfy a threshold value.

5. The computer-implemented method of claim 1, wherein the first video includes a first audio signal synched with the first video frame and the second video frame.

6. The computer-implemented method of claim 5, further comprising:
    retrieving a set of audio signals extracted from the videos stored in the video data repository;
    comparing the first audio signal with each of the audio signals in the set of audio signals;
    identifying a second audio signal based at least in part on the comparison of the first audio signal with each of the audio signals in the set of audio signals, wherein the second audio signal correlates to the first audio signal; and
    retrieving the second video from the video data repository, wherein the second string value was generated from the second video and the second audio signal was extracted from the second video.

7. A system comprising:
    a first computer data repository that stores video files and a set of string values generated based at least in part on the video files, the first computer data repository comprising a non-transitory storage device; and
    a first computing system comprising one or more first computing devices, the first computing system in communication with the first computer data repository and programmed to implement at least:
        a network interface configured to at least receive, from a second computing device, a first video, wherein the first video comprises a first video frame and a second video frame;
        a video analyzer configured to at least:
            identify a shape in the first video frame and in the second video frame;
            assign an object reference to the shape;
            determine a first angle between the shape and a fixed axis in the first video frame;
            determine a second angle between the shape and the fixed axis in the second video frame; and
            generate a first string value based at least in part on the object reference, the first angle, and the second angle;
        a video comparison engine configured to at least:
            retrieve the set of string values from the first computer data repository;
            compare the first string value with at least some of the string values in the set of string values; and
            identify a second string value that correlates to the first string value; and
        a video retrieval engine configured to retrieve a second video from the first computer data repository, wherein the second string value was generated from the second video,
        wherein the network interface is further configured to transmit the second video to the second computing device.

8. The system of claim 7, wherein the first string value comprises a first field, the first field including:
- a combination of the object reference and the first angle; and
- a second field that follows the first field, the second field comprising a combination of the object reference and the second angle.

9. The system of claim 7, wherein the video comparison engine is further configured to compare a color value of the shape with a color value of the second shape.

10. The system of claim 9, wherein the network interface is further configured to transmit the second video to the second computing device if the color value of the shape and the color value of the second shape satisfy a threshold value.

11. The system of claim 7,
wherein the first video comprises a first audio signal synched with the first video frame and the second video frame,
wherein the video comparison engine is further configured to at least:
- retrieve a set of audio signals extracted from the video files stored in the first computer data repository;
- compare the first audio signal with at least some of the audio signals in the set of audio signals; and
- identify a second audio signal from the set of extracted audio signals based at least in part on the comparison of the first audio signal with at least some of the audio signals in the set of audio signals, wherein the second audio signal correlates to the first audio signal; and
wherein the video retrieval engine retrieves the second video from the first computer data repository utilizing the second string value that was generated from the second video and the second audio signal extracted from the second video.

12. A computer storage system comprising a non-transitory storage device, said computer storage system having stored thereon executable program instructions that direct a computer system to at least:
- receive a first video, wherein the first video comprises a first video frame and a second video frame;
- identify a shape in the first video frame and in the second video frame;
- assign an object reference to the shape in the first video frame and in the second video frame;
- determine a first angle between the shape and a fixed axis in the first video frame;
- determine a second angle between the shape and the fixed axis in the second video frame;
- generate a first textual representation of actions depicted in the first video based at least in part on the object reference, the first angle, and the second angle;
- transmit the first textual representation to a video search system; and
- receive a second video from the video search system, wherein the second video has a second textual representation that correlates to the first textual representation.

13. The computer storage system of claim 12, wherein the first textual representation comprises:
- a first field comprising a combination of the object reference and the first angle; and
- a second field that follows the first field, the second field comprising a combination of the object reference and the second angle.

14. The computer storage system of claim 13, wherein the second textual representation comprises a third field and a fourth field that follows the third field, and wherein the third field correlates to the first field and the fourth field correlates to the second field.

15. The computer storage system of claim 12,
wherein the first video comprises a first audio signal synched with the first video frame and the second video frame,
wherein the executable program instructions further direct the computer system to at least transmit the first audio signal to the video search system, and
wherein the second video received from the video search system has a second textual representation that correlates to the first textual representation and a second audio signal that correlates to the first audio signal.

16. A computer-implemented method comprising:
as implemented by one or more computer systems comprising computer hardware and memory, the one or more computer systems configured with specific executable instructions,
- receiving a designation of a reference video for conducting a search;
- assigning an object reference to a shape in a first video frame of the reference video and in a second video frame of the reference video;
- determining a first angle between the shape and a fixed axis in the first video frame;
- determining a second angle between the shape and the fixed axis in the second video frame;
- generating a reference textual representation of actions depicted in the reference video based at least partly on the object reference, the first angle, and the second angle;
- comparing the reference textual representation with a plurality of textual representations generated from videos stored in a library of videos; and
- generating video search results based at least partly on the comparison.

17. The computer-implemented method of claim 16, further comprising:
- receiving a reference color value;
- comparing the reference color value with color values found in the videos stored in the library of videos; and
- generating video search results that are based at least partly on the comparison of the reference textual representation and the plurality of textual representations, and at least partly on the comparison of the reference color value and the color values found in the videos.

18. The computer-implemented method of claim 16, further comprising:
- receiving a reference audio signal;
- comparing the reference audio signal with a plurality of audio signals associated with the videos stored in the library of videos; and
- generating video search results that are based at least partly on the comparison of the reference textual representation and the plurality of textual representations, and at least partly on the comparison of the reference audio signal and the plurality of audio signals associated with the videos.

19. The computer-implemented method of claim 16, wherein the content of the reference video comprises a second shape, and wherein the reference textual representation is based at least in part on a movement of the second shape in the reference video.

20. The system of claim 8, wherein the second string value comprises a third field and a fourth field that follows the third field, and wherein the third field correlates to the first field and the fourth field correlates to the second field.

* * * * *